United States Patent
Elwaei

(10) Patent No.: US 11,454,023 B1
(45) Date of Patent: Sep. 27, 2022

(54) WALLCOVERING SYSTEM AND METHOD OF USE

(71) Applicant: Walid Elwaei, Fort Worth, TX (US)

(72) Inventor: Walid Elwaei, Fort Worth, TX (US)

( * ) Notice: Subject to any disclaimer, the term of this patent is extended or adjusted under 35 U.S.C. 154(b) by 0 days.

(21) Appl. No.: 16/884,540

(22) Filed: May 27, 2020

Related U.S. Application Data

(60) Provisional application No. 62/992,682, filed on Mar. 20, 2020.

(51) Int. Cl.
| | | |
|---|---|---|
| *E04C 2/20* | (2006.01) |
| *E04B 1/14* | (2006.01) |
| *E04B 1/12* | (2006.01) |
| *E04C 2/38* | (2006.01) |
| *E04C 2/40* | (2006.01) |
| *B32B 5/18* | (2006.01) |

(52) U.S. Cl.
CPC .............. *E04C 2/205* (2013.01); *E04B 1/12* (2013.01); *E04B 1/14* (2013.01); *E04C 2/38* (2013.01); *E04C 2/40* (2013.01); *B32B 5/18* (2013.01); *B32B 2255/26* (2013.01); *B32B 2266/0285* (2013.01); *B32B 2325/00* (2013.01)

(58) Field of Classification Search
CPC ... E04C 2/205; E04C 2/40; E04C 2/38; E04B 1/12
See application file for complete search history.

(56) References Cited

U.S. PATENT DOCUMENTS

| | | | | |
|---|---|---|---|---|
| 5,843,329 A | * | 12/1998 | Deetz | G09F 7/04 |
| | | | | 252/62.54 |
| 10,167,630 B2 | * | 1/2019 | Giles | E04B 2/562 |
| 10,301,823 B2 | * | 5/2019 | Kreizinger | E04F 13/077 |
| 2013/0167474 A1 | * | 7/2013 | Carlson | F25D 23/02 |
| | | | | 52/784.15 |
| 2015/0140341 A1 | * | 5/2015 | Robinson | C04B 26/16 |
| | | | | 428/425.9 |
| 2017/0210098 A1 | * | 7/2017 | Moore | B32B 23/04 |
| 2017/0368785 A1 | * | 12/2017 | Fox | B32B 3/18 |
| 2018/0100306 A1 | * | 4/2018 | Steppan | B05D 1/02 |
| 2018/0112394 A1 | * | 4/2018 | Giles | E04B 1/7629 |
| 2018/0202159 A1 | * | 7/2018 | Kreizinger | E04B 2/707 |
| 2019/0242127 A1 | * | 8/2019 | Kreizinger | E04B 2/707 |
| 2019/0345713 A1 | * | 11/2019 | Lolley | E04B 1/80 |
| 2019/0352903 A1 | * | 11/2019 | Giles | B32B 27/12 |
| 2020/0141118 A1 | * | 5/2020 | Kreizinger | B32B 27/40 |

* cited by examiner

*Primary Examiner* — Babajide A Demuren
(74) *Attorney, Agent, or Firm* — Leavitt Eldredge Law Firm

(57) ABSTRACT

A wallcovering system allows for the rapid creation of interior walls through bonding panels that could be foam or another material to which polyurea adheres. The panels could have joints therein to physically join the panels while the primary adhesion results from the application of the polyurea or another derivative. Also, particles or other additives could be placed in the walls to enable additional functions.

2 Claims, 6 Drawing Sheets

FIG. A: the claimed invention as shown in FIG. 1A.

WALLCOVERING SYSTEM AND METHOD OF USE

BACKGROUND

1. Field of the Invention

The present invention relates generally to construction systems, and more specifically, to a wallcovering system to effectively and cost-efficiently form interior walls that present the look and feel of walls that are common.

2. Description of Related Art

Construction systems are well known in the art and are effective means to fabricate structures such as homes, offices and the like. Commonly, structures are made by assembling a frame and then putting up an exterior and interior wall. For example, a conventional home has a wood frame that is anchored to a foundation. The interior walls are formed by drywall panels that are attached to the frame. The drywall is then textured and painted to form a finished wall.

One of the problems commonly associated with common construction systems is its limited efficiency. For example, to finish an interior wall, the drywall must be cut, trimmed, fastened, taped, plastered and then painted. Each step is time-consuming and required precise work for a good finish. Additionally, the drywall is not considered to be strong as a strong hit, a fall or heavy object can penetrate it and will necessitate a repair.

Accordingly, although great strides have been made in the area construction systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
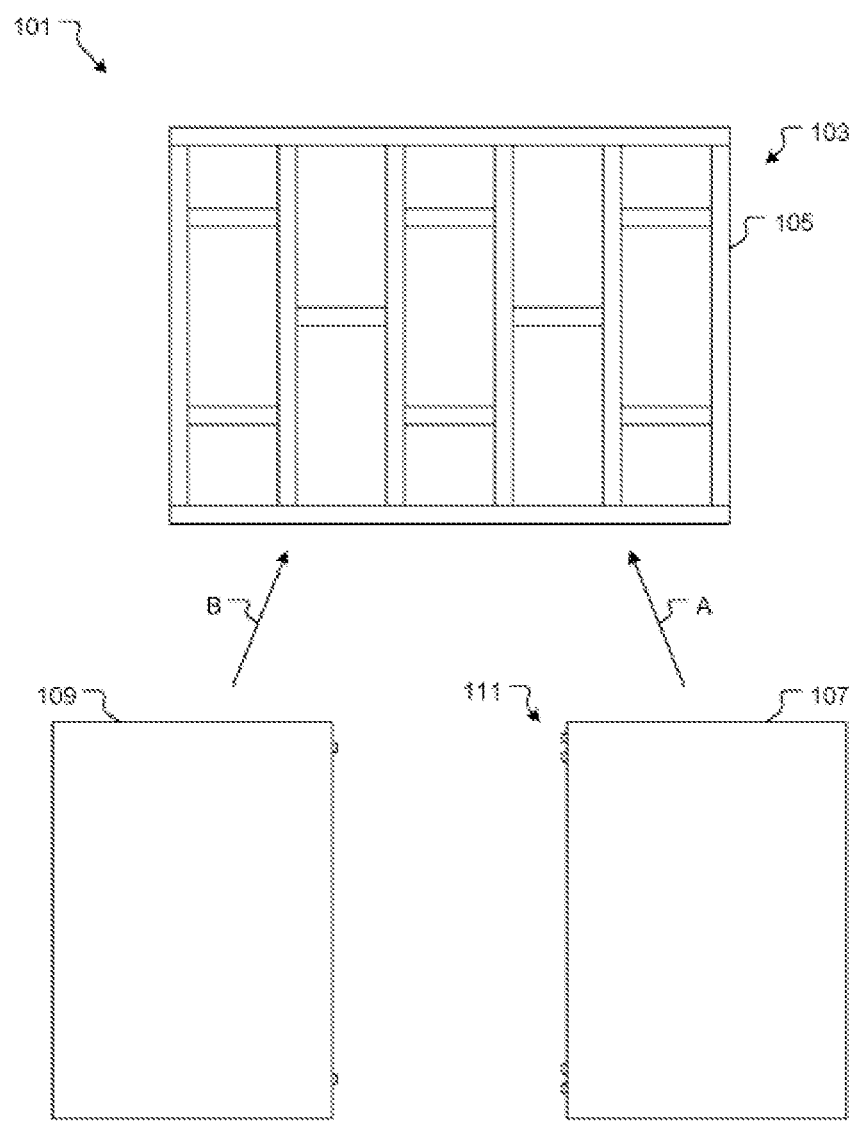
FIGS. 1A, 1B and 1C are front views of a wallcovering system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional construction systems. Specifically, the present invention allows for the rapid creation of interior walls that are stronger than what is commonly found. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
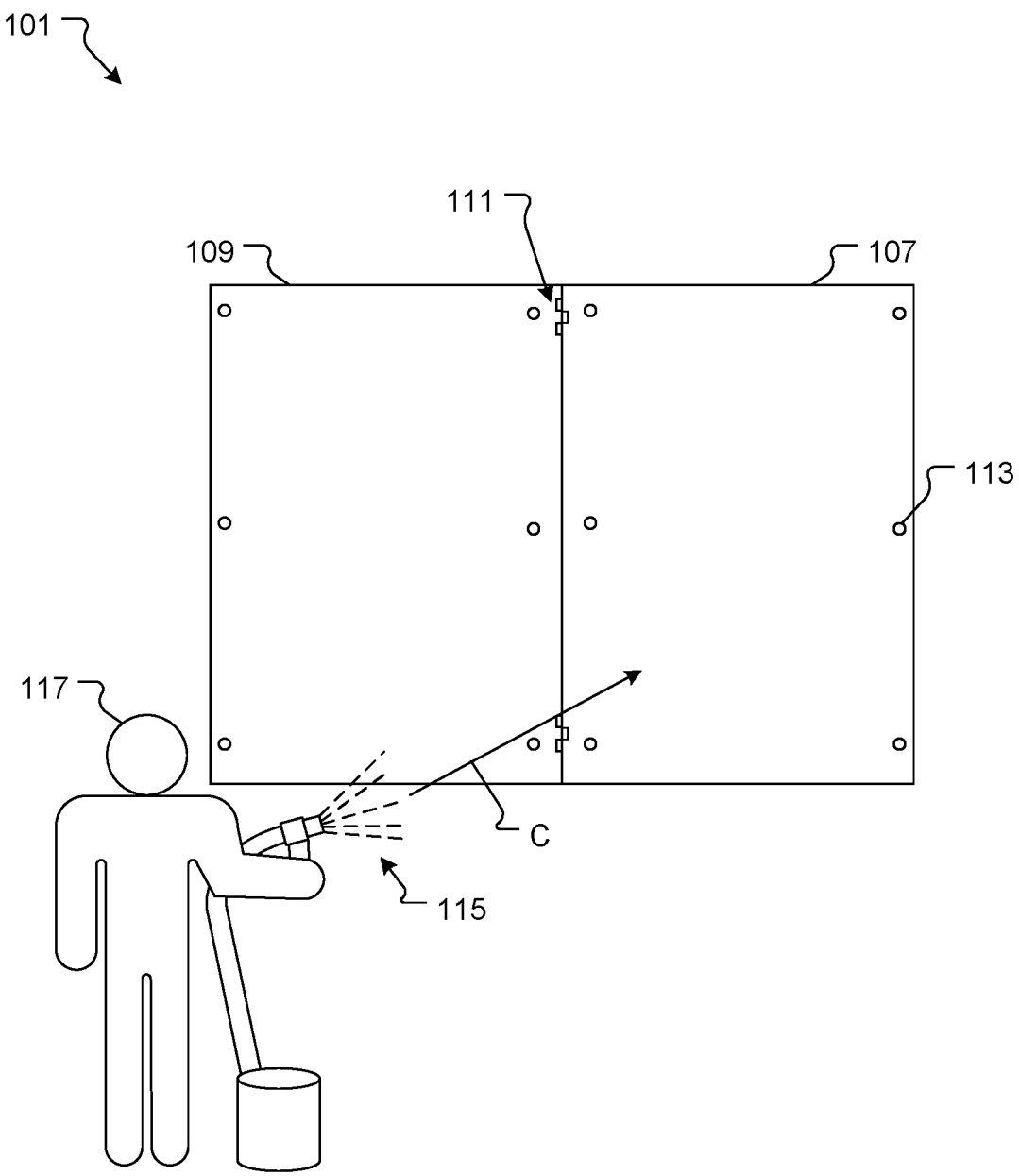
Figure 1C:
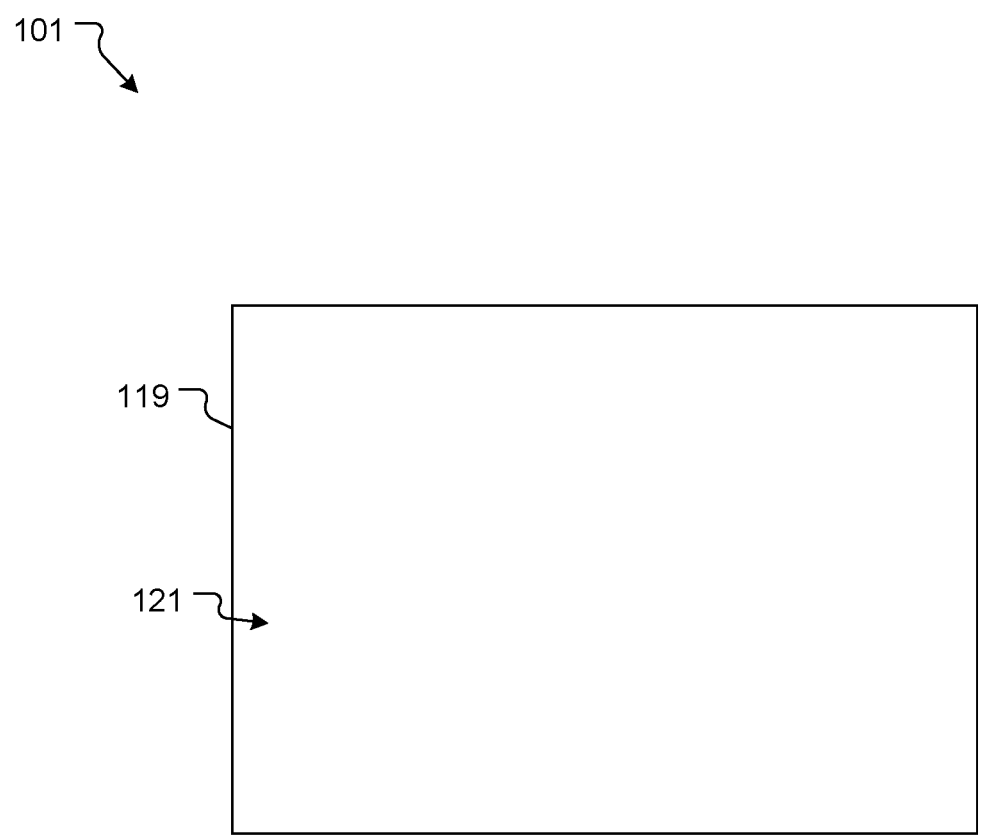

Referring now to the drawings wherein like reference characters identify corresponding or similar elements throughout the several views, FIGS. 1A, 1B and 1C depict front views of a wallcovering system in accordance with a preferred embodiment of the present application. It will be appreciated that system 101 overcomes one or more of the above-listed problems commonly associated with conventional construction systems.

In the contemplated embodiment, system 101 includes a frame 103 having vertical and support members 105. A first bonding panel 107 and a second bonding panel 109 are connected by a joint 111 and are attached to the support members 105 of the frame 103 via fasteners 113. A polyurea layer 115 is then applied to the first bonding panel 107 and the second bonding panel 109.

The wall panel 119 is formed by attaching the first bonding panel 107 to the support members 105 of the frame via fasteners as depicted by motion A. The second bonding panel 109 is likewise attached as depicted by motion B. The joints 111 between the first bonding panel 107 and the second bonding panel 109 are used to strengthen the point where the panels meet. The polyurea layer 115 is then applied by a worker 117 as depicted by motion C. The polyurea layer 115 covers the fasteners 113 and joints to create a single surface 121 for the wall panel 119.

Figure 2:
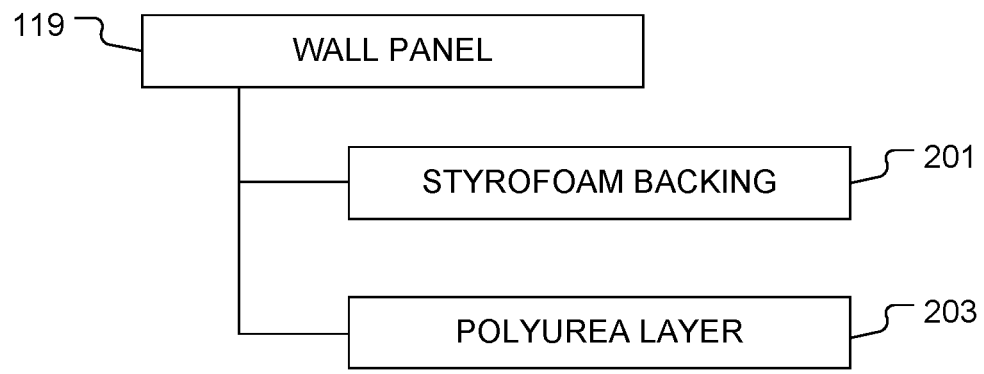
FIG. 2 is a schematic of the wall panel of FIGS. 1A, 1B and 1C.
Figure 3:
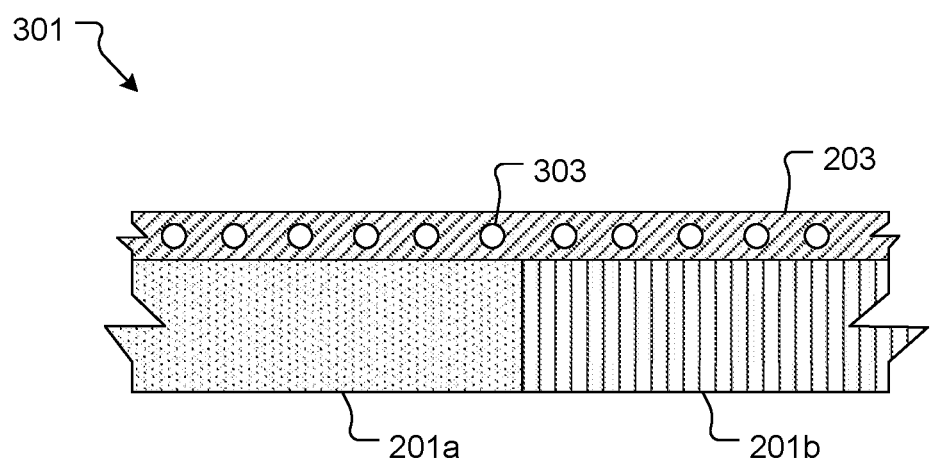
FIG. 3 is a cross-sectional top view of the wall panel of FIGS. 1A, 1B and 1C.

The wall panel 119 is further depicted in FIGS. 2 and 3. The wall panel 119 includes polystyrene backing 201 with a polyurea layer 203. It is contemplated that the polystyrene backing 201 could be in multiple segments and that joints 111 would serve to lock the segments together. It is contemplated that the polyurea layer 203 could include additives 303 such as in wall panel 301. These additives could be pigments, magnetic or the like.

It is contemplated that while a polyurea layer 115 is described it is contemplated that any of is derivatives such as polyurethane could also be used to join the bonding panels.

It should be appreciated that one of the unique features believed characteristic of the present application is that first bonding panel 107 and second bonding panel 109 are united into a single wall panel 119 via the joints 111 and the polyurea layer 115.

Figure 4:
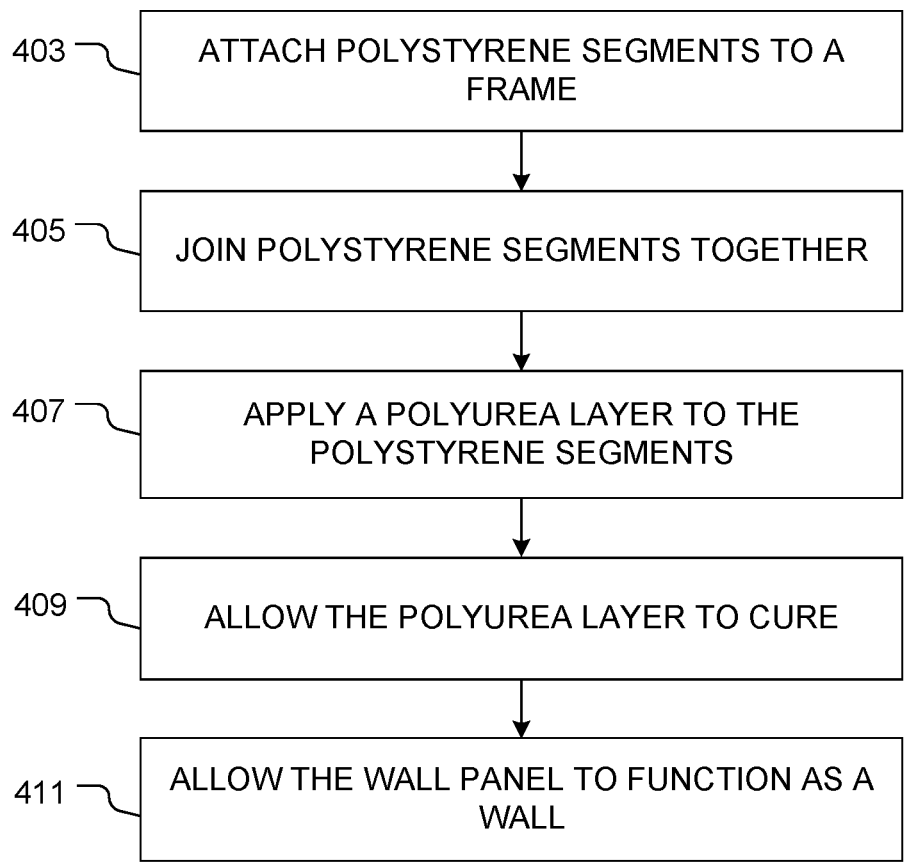
FIG. 4 is a flowchart of a method of creating a wall panel.

Referring now to FIG. 4 a method of creating a wall panel is depicted. Method 401 includes attaching polystyrene segments to a frame 403, joining polystyrene segments together 405, applying a polyurea layer to the polystyrene segments 407, allowing the polyurea layer to cure 409 and allowing the wall panel to function as a wall 411.

Figure 5:
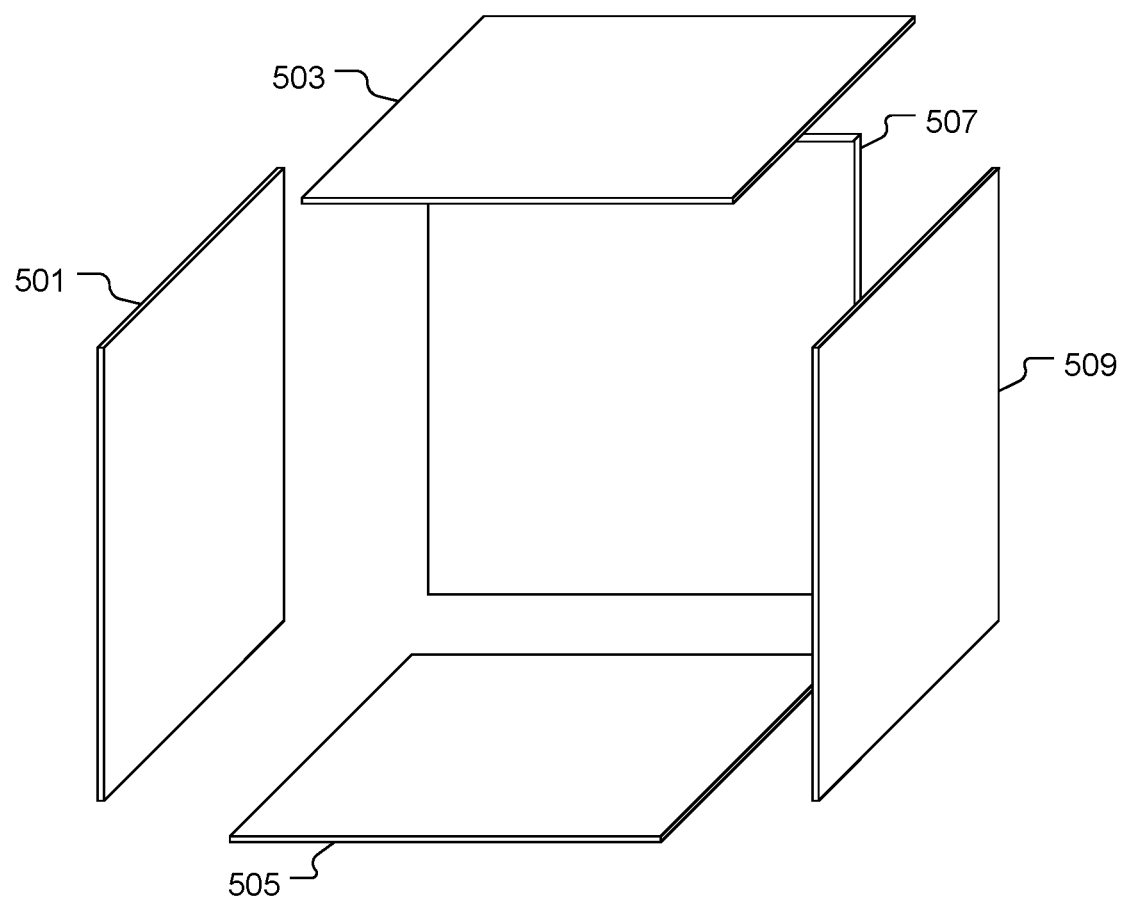
FIG. 5 is a perspective view of alternative uses of the panel of FIGS. 1A, 1B, and 1C.

While the panel has been depicted and described as a wall it is contemplated as shown in FIG. 5 the panels could be used for multiple walls. Such as a first side panel 501, a second wall panel 509, a back-wall panel 507, a floor panel 505 or a ceiling panel 503. It is contemplated that any structural or dividing wall could use the system disclosed herein.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A wallcovering system comprising;
   a foam panel attached to a frame, the foam panel having a top surface;
   a second foam panel attached to the frame;
   a plurality of fasteners configured to engage with the foam panel and configured to secure the foam panel to both the frame and the second foam panel;
   a polyurea layer joined to the top surface of the foam panel, the polyurea layer is configured to cover an entire surface area of both the foam panel and second foam panel to increase structural support; and
   a magnetic additive disposed solely within a thickness of the polyurea layer;
   wherein both the plurality of fasteners and the polyurea layer secure the foam panel and the second foam panel to each other to form a wall panel.

2. The system of claim 1 wherein the bonding panel is used as a floor or ceiling.

* * * * *